United States Patent Office 3,540,890
Patented Nov. 17, 1970

3,540,890
PROCESS FOR PRODUCING ONION FLAVORED RING SNACK
John O. Benson, Mayer, Minn., assignor to General Mills, Inc., a corporation of Delaware
No Drawing. Filed Jan. 25, 1967, Ser. No. 611,591
Int. Cl. A23l 1/10
U.S. Cl. 99—83                    9 Claims

ABSTRACT OF THE DISCLOSURE

A gelatinous onion flavored cereal dough is mixed and then it is extruded as a hollow tube. This tube is sliced to form rings. These rings are dried, breaded, and then deep fat fried to a crisp, tender, irregularly shaped ring.

---

This invention relates to an onion flavored food product. More particularly, it pertains to a ready-to-eat onion flavored ring-shaped snack product and the process of making the same.

One object of this invention is to provide a ready-to-eat food product having the characteristic shape and flavor of a deep fat fried onion ring.

Another object of this invention is to provide a process for making such a product.

Other objects and advantages of this invention will be apparent from the following description in which certain preferred embodiments of the invention are disclosed.

The present invention comprises mainly preparing a farinaceous dough such as from rice flour or other suitable dough-forming ingredient, onion powder, salt and water, cooking the dough, extruding the cooked dough through a die in the form of a hollow tube, slicing the hollow tubular extruded dough to form rings, drying the rings, breading the dried rings, and then deep fat frying the breaded rings.

The following examples will serve to illustrate the invention. A dry mix or blend of the following ingredients is prepared: approximately 93 parts, by weight, of rice flour, 5 parts, by weight, of onion powder, and 2 parts, by weight, of salt. This dry blend is fed continuously at the rate of 0.43 lb. per minute into a cooking chamber which has water added thereto at the rate of 0.20 lb. per minute to form a dough of the desired consistency.

The dough is mixed and kneaded while being cooked, at a temperature of about 212° Fahrenheit for a period of about 60 minutes. The dough cooker shown in James Patent No. 2,233,919 has been found to be highly satisfactory for this purpose. After being cooked, the dough is forced from the cooking chamber through an extruding die having an outside diameter of about ¾ inch to provide a thin walled hollow tube with a wall thickness of approximately 0.050 inch. Most any commercially available plastic extruder provided with an extruding die to provide a thin walled hollow tube with an outside diameter of about ¾ inch and with a wall thickness of approximately 0.050 inch will be satisfactory for performing this extrusion. For example, a Model 55 1½ inch extruder of the National Rubber Machinery Company which was available in April 1960 could be used as the extruder.

The tubes which are extruded are placed on a suitable "tempering" platform or conveyor to permit equalization of the moisture content throughout the mass of the tubes. While the tubes are on the platform or conveyor they are held in their tubular condition by forcing compressed air through the hollow center thereof. After the extruded material has had time to cool and set up or firm for 1 to 2 minutes, i.e. temper, a knife severs the extruded material to form rings thereof approximately ¼ inch wide.

The rings are then dried at a controlled rate to provide rings having a moisture content of 8½%, by weight. This drying can be accomplished at atmospheric conditions in 12 to 16 hours or in an equalizing dryer, a perforated drum having an internal helix to move the rings along the inner surface thereof using air at approximately 130° Fahrenheit for around 4 hours. The drying can also be accomplished in approximately 3 hours at a temperature of approximately 150° Fahrenheit.

The dried rings are then coated with bread crumbs. This breading is accomplished by momentarily immersing the dried rings in a liquid batter of approximately 84 parts, by weight, of whole milk, 12 parts, by weight, of salt, 2 parts, by weight, of egg powder, and of 2 parts, by weight, of flour. This immersing should be just long enough to get moisture on the exterior surface of the rings and not allow the moisture to soak into the rings. Usually 5 to 10 seconds is sufficient for this purpose. The wetted rings are then rolled or tumbled in bread crumbs which because of the sticky batter in which the rings were dipped, adhere to the ring surfaces. The bread crumbs used have been sifted to go through a Number 12 U.S. Standard screen and are retained on a Number 30 U.S. Standard screen. As used herein, the term "U.S. Standard screen" is as defined in the "Handbook of Chemistry And Physics 40th Edition 1958–59," page 3359.

The breaded rings are then deep fat fried in a standard continuous, commercially available, deep fat fryer for a short holding or product immersion time. This deep fat frying is accomplished by holding the rings for 18 seconds in any commercially available deep fat frying oil at a temperature of 400° Fahrenheit. The deep fat frying can also be accomplished in almost any commercially available deep fat frying oil at temperatures of between 350° Fahrenheit to 450° Fahrenheit for periods of time from 6 to 25 seconds. This deep fat frying provides a breaded ring having a moisture content of 2½ to 3½ percent, by weight.

The present process is applicable to the treatment of virtually any type of cooked dough including onion powder in sufficient quantities to produce the desired onion flavor. For example, instead of using a rice flour, other flours or meals such as those made from wheat, oats, corn or combinations thereof, may be used. The term "farinaceous" as used herein is intended to include these and other cereals. It will, of course, also be understood that the composition and amount of ingredients of the onion flavored ring snack dough described may be varied in various ways.

While the invention has been described in detail with specific examples, such examples are illustrative and are not given as limitations since other modifications within the sphere and scope of the invention will be apparent to those skilled in the art. For example, as noted above the composition of the dough as well as its moisture content may be varied widely. Likewise, the 60-minute cooking time at a temperature of 212° Fahrenheit may be altered considerably as long as the cooking conditions do not burn off the onion flavor of the dry mix. In addition, the outside diameter of the extruded tube from which the rings are sliced can vary as well as the thickness of the slice and the thickness of the walls which can vary between 0.035 inch to 0.060 inch. The moisture content of the dried rings can vary between 6% to 12% by weight.

In view of the principles set forth herein I have shown some of the ways of carrying out the present invention and some of the equivalents which are suggested by the disclosures.

Now, therefore, I claim:

1. The process of producing an edible onion flavored ring which comprises forming a dough from water and an onion flavored farinaceous material, cooking the dough, forming the cooked dough into thin-walled rings, drying said rings to a moisture content in the range from 6 to 12 percent by weight, breading the thin-walled rings, and deep fat frying the breaded thin-walled rings.

2. The process of producing an edible onion flavored ring as called for in claim 1 wherein the forming of the dough includes mixing water, a farinaceous material, and onion powder.

3. The process of producing an edible onion flavored product as called for in claim 1 wherein the forming of the dough includes mixing water, a farinaceous material, onion powder, and salt.

4. The process of producing an edible onion flavored ring as called for in claim 1 wherein the dough forming includes mixing flour, onion powder, salt and water.

5. The process of producing an edible onion flavored ring as called for in claim 1 wherein the dough forming includes mixing flour, onion powder and salt to form a dry mix, then feeding this dry mix at a controlled rate into a cooking chamber, and simultaneously with the feeding of said dry mix, feeding water into said cooking chamber at a controlled rate.

6. The process of producing an edible onion flavored ring as called for in claim 5 wherein said cooking is accomplished simultaneously with said feeding of said dry mix and said water into said cooking chamber.

7. The process of producing an edible onion flavored ring as called for in claim 1 wherein the forming of the cooked dough into thin-walled rings includes extruding the cooked dough through a die to produce a hollow tube, and slicing said hollow tube into rings.

8. The process of producing an edible onion flavored ring as called for in claim 7 wherein said extruded hollow tube of dough is tempered prior to said slicing.

9. The process of producing an edible onion flavored ring as called for in claim 1 wherein the breading of the rings includes wetting said rings momentarily in a liquid batter and then tumbling said wetted rings in bread crumbs.

References Cited
UNITED STATES PATENTS

| | | | |
|---|---|---|---|
| 2,771,370 | 11/1956 | Allen | 99—193 |
| 2,905,559 | 9/1959 | Anderson et al. | 99—80 |
| 3,057,386 | 10/1962 | Massara | 99—100 XR |
| 3,282,701 | 11/1966 | Wong et al. | 99—1 |

RAYMOND N. JONES, Primary Examiner